(12) United States Patent
Rioux et al.

(10) Patent No.: US 10,113,436 B2
(45) Date of Patent: Oct. 30, 2018

(54) CHORDAL SEAL WITH SUDDEN EXPANSION/CONTRACTION

(71) Applicant: United Technologies Corporation, Hartford, CT (US)

(72) Inventors: Philip Robert Rioux, North Berwick, ME (US); Paul M. Lutjen, Kennebunkport, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 292 days.

(21) Appl. No.: 15/017,798

(22) Filed: Feb. 8, 2016

(65) Prior Publication Data

US 2017/0226876 A1 Aug. 10, 2017

(51) Int. Cl.
| | | |
|---|---|---|
| F01D 5/12 | (2006.01) |
| F01D 9/04 | (2006.01) |
| F01D 11/00 | (2006.01) |
| F01D 11/08 | (2006.01) |
| F01D 25/12 | (2006.01) |
| F01D 5/22 | (2006.01) |
| F01D 9/00 | (2006.01) |

(52) U.S. Cl.
CPC ............... F01D 9/041 (2013.01); F01D 5/12 (2013.01); F01D 5/225 (2013.01); F01D 9/00 (2013.01); F01D 11/005 (2013.01); F01D 11/08 (2013.01); F01D 25/12 (2013.01); F05D 2220/32 (2013.01)

(58) Field of Classification Search
USPC ............................................ 415/173.1, 173.7
See application file for complete search history.

(56) References Cited

U.S. PATENT DOCUMENTS

| | | | | |
|---|---|---|---|---|
| 6,345,494 | B1 * | 2/2002 | Coslow | F01D 9/023 |
| | | | | 60/39.37 |
| 2008/0118346 | A1 * | 5/2008 | Liang | F01D 11/005 |
| | | | | 415/115 |
| 2009/0096174 | A1 * | 4/2009 | Spangler | F01D 11/005 |
| | | | | 277/345 |
| 2009/0243228 | A1 | 10/2009 | Heinemann et al. | |
| 2011/0044801 | A1 * | 2/2011 | Di Paola | F01D 9/04 |
| | | | | 415/173.1 |
| 2011/0049812 | A1 * | 3/2011 | Sutcu | F01D 9/023 |
| | | | | 277/603 |

(Continued)

FOREIGN PATENT DOCUMENTS

| | | |
|---|---|---|
| EP | 2415969 A1 | 2/2012 |
| WO | WO 2014052345 A1 | 4/2014 |

(Continued)

OTHER PUBLICATIONS

Extended European Search Report for EP Application No. 17155024.7, dated Jul. 6, 2017, 7 pages.

*Primary Examiner* — Igor Kershteyn
*Assistant Examiner* — Theodore Ribadeneyra
(74) *Attorney, Agent, or Firm* — Kinney & Lange, P.A.

(57) ABSTRACT

A static component for a gas turbine engine includes an axially extending body comprising a forward end and an aft end disposed axially downstream from the forward end. A rib is formed on at least one of the forward end and the aft end of the axially extending body and extending axially from the axially extending body. A recess is formed in the rib.

15 Claims, 6 Drawing Sheets

(56) References Cited

U.S. PATENT DOCUMENTS

2014/0127006 A1* 5/2014 Romanov ............... F01D 11/08
                                                           415/173.1
2014/0140825 A1* 5/2014 Clouse ................ F01D 25/246
                                                           415/173.1

FOREIGN PATENT DOCUMENTS

WO      2014204574 A2   12/2014
WO   WO 2015021029 A1    2/2015

* cited by examiner

CHORDAL SEAL WITH SUDDEN EXPANSION/CONTRACTION

BACKGROUND

The present invention relates to gas turbine engines, and more specifically to seals for use in turbine sections of gas turbine engines.

Gas turbine engines, such as those that power modern commercial and military aircraft, typically include a compressor to pressurize inflowing air, a combustor to burn a fuel in the presence of the pressurized air, and a turbine to extract energy from the resulting combustion gases. The turbine may include multiple rotatable blade arrays separated by multiple stationary vane arrays. A turbine blade array is typically situated radially within a blade outer air seal system or assembly (or "BOAS" system or assembly). In other words, a BOAS assembly may span an outer endwall between a plurality of static vane arrays situated upstream and downstream of the blade array. The BOAS assembly thus forms an outer (cylindrical) wall configured to confine a stream of hot post-combustion gases.

Cooling air is often provided to the BOAS assembly to enable operation while exposed to the hot combustion gases. This cooling air may be bled from one or more air compartments situated in proximity to the BOAS assembly and through one or more bleed apertures disposed within the BOAS assembly. A higher pressure is typically required to direct cooling air through the BOAS assembly. Effective seals may prevent leakage of cooling air between the BOAS assembly and adjacent component assemblies (e.g., vanes or vane arrays), thus allowing cooling air to flow within segments of the BOAS assembly.

As the turbine is heated by the combustor exhaust and pressurized, the cooling air may undesirably escape into the turbine through a variety of gaps between the BOAS assembly and adjacent vane arrays and other pathways formed as a result of thermal and maneuvering stresses placed upon the engine parts during operation. The thermal, mechanical and pressure induced deflections of individual components may require that some seals perform with substantial relative motion between sealing surfaces. More particularly, various BOAS assemblies may be capable of expanding and/or contracting in a radial direction to compensate for a radial motion of turbine blades or blade tips resulting from the forces placed upon the blades during operation (e.g., a maneuvering operation). Thus, seals are needed that will both allow relative movement between a BOAS assembly and adjacent vane arrays and minimize cooling air leakage between the BOAS and adjacent vane arrays. Minimizing cooling air leakage between the BOAS and the adjacent vane arrays can lead to improvements in gas turbine engine performance, such as improved flow output and increased fuel efficiency.

SUMMARY

In one aspect of the invention, a static component for a gas turbine engine includes an axially extending body comprising a forward end and an aft end disposed axially downstream from the forward end. A rib is formed on at least one of the forward end and the aft end of the axially extending body and extending axially from the axially extending body. A recess is formed in the rib.

In another aspect of the invention, a vane and rotor assembly for a gas turbine engine includes a rotor assembly and a vane assembly. The rotor assembly includes an outer diameter endwall with a forward end disposed upstream from an aft end. The vane assembly is positioned upstream from the rotor assembly. The vane assembly includes an outer diameter platform with an aft end disposed axially upstream from the forward end of the outer diameter endwall of the rotor assembly. At least one airfoil extends from the outer diameter platform toward a center axis of the gas turbine engine. A rib is formed on the aft end of the outer diameter platform and extends axially aft from the aft end of the outer diameter platform toward the forward end of the outer diameter endwall of the rotor assembly. The rib contacts the forward end of the outer diameter endwall of the rotor assembly. A recess is formed in the rib.

In another aspect of the invention, a vane segment for a gas turbine engine includes an outer diameter platform positioned radially outward from a center axis of the gas turbine engine. The outer diameter platform includes a forward end and an aft end disposed axially downstream from the forward end. At least one airfoil extends from the outer diameter platform toward the center axis. A first rib is formed on the aft end of the outer diameter platform and extends axially aft from the aft end of the outer diameter platform. A second rib is formed on the aft end of the outer diameter platform and extends axially aft from the aft end of the outer diameter platform. A recess is disposed between the first rib and the second rib.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The invention relates to a turbine engine component, and more specifically, a vane segment in a gas turbine engine that includes a rib and recess formed on an aft end of an outer diameter platform of the vane segment. The rib engages a forward end of an adjacent component, such as a blade outer air seal (BOAS) of a turbine rotor assembly, to impede cooling air from leaking between the vane segment and the BOAS into a core flow of the gas turbine engine. The recess in the rib can cause any cooling air leaking between the rib and the forward end of the BOAS to suddenly expand. By expanding the cooling air in the recess, the recess decreases the pressure of the cooling air in the recess to a sufficient degree that the cooling air in the recess has more difficulty overcoming the pressure in the core flow and escaping into the core flow. Reducing the amount of cooling air that escapes into the core flow increases the fuel efficiency and operating performance of the gas turbine engine.

Figure 1:
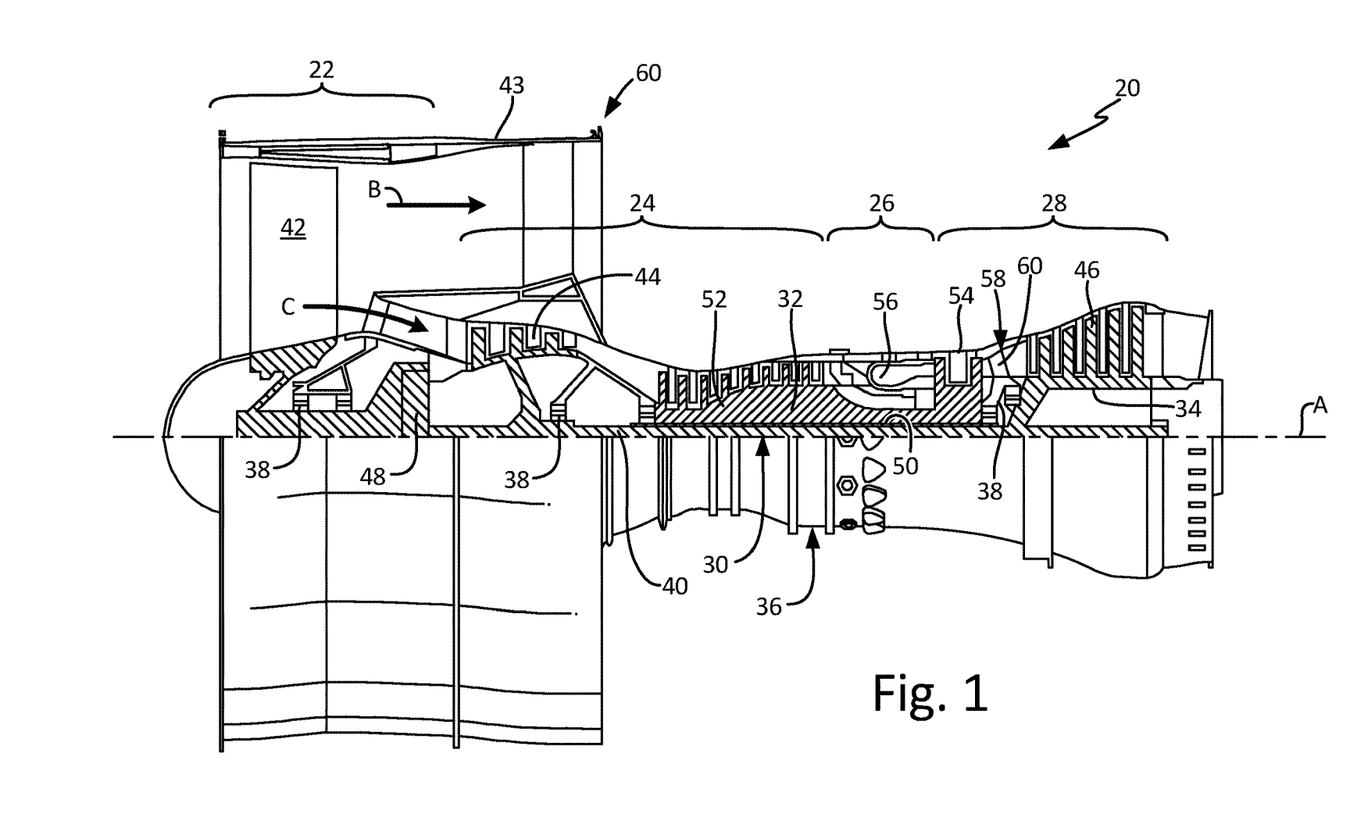
FIG. 1 is a partial cross-sectional view of a gas turbine engine.

FIG. 1 is a quarter-sectional view that schematically illustrates example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about center axis A.

Combustor 56 is arranged between high pressure compressor 52 and high pressure turbine 54. In one example, high pressure turbine 54 includes at least two stages to provide double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 can be arranged generally between high pressure turbine 54 and low pressure turbine 46. Mid-turbine frame 58 further supports bearing systems 38 in turbine section 28 as well as setting airflow entering the low pressure turbine 46.

The core airflow C is compressed first by low pressure compressor 44 and then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the axial length of the low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

Figure 2:
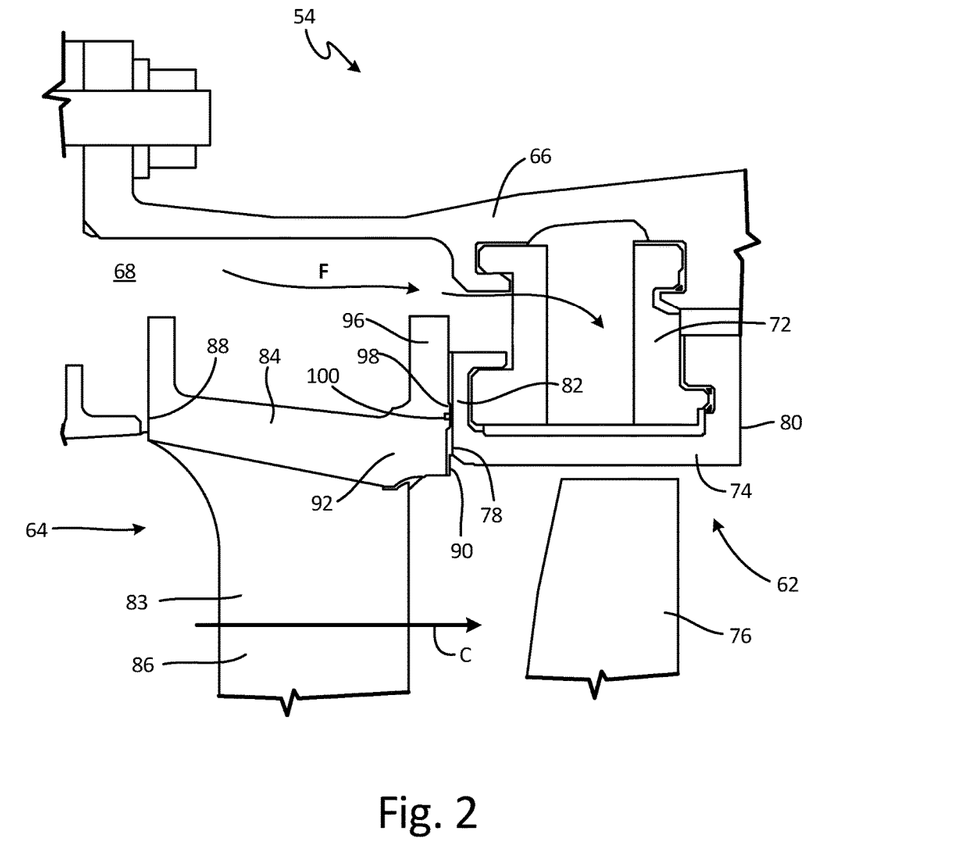
FIG. 2 is a cross-sectional view of a first vane stage and a first rotor stage of a high pressure turbine section of the gas turbine engine from FIG. 1.
Figure 3:
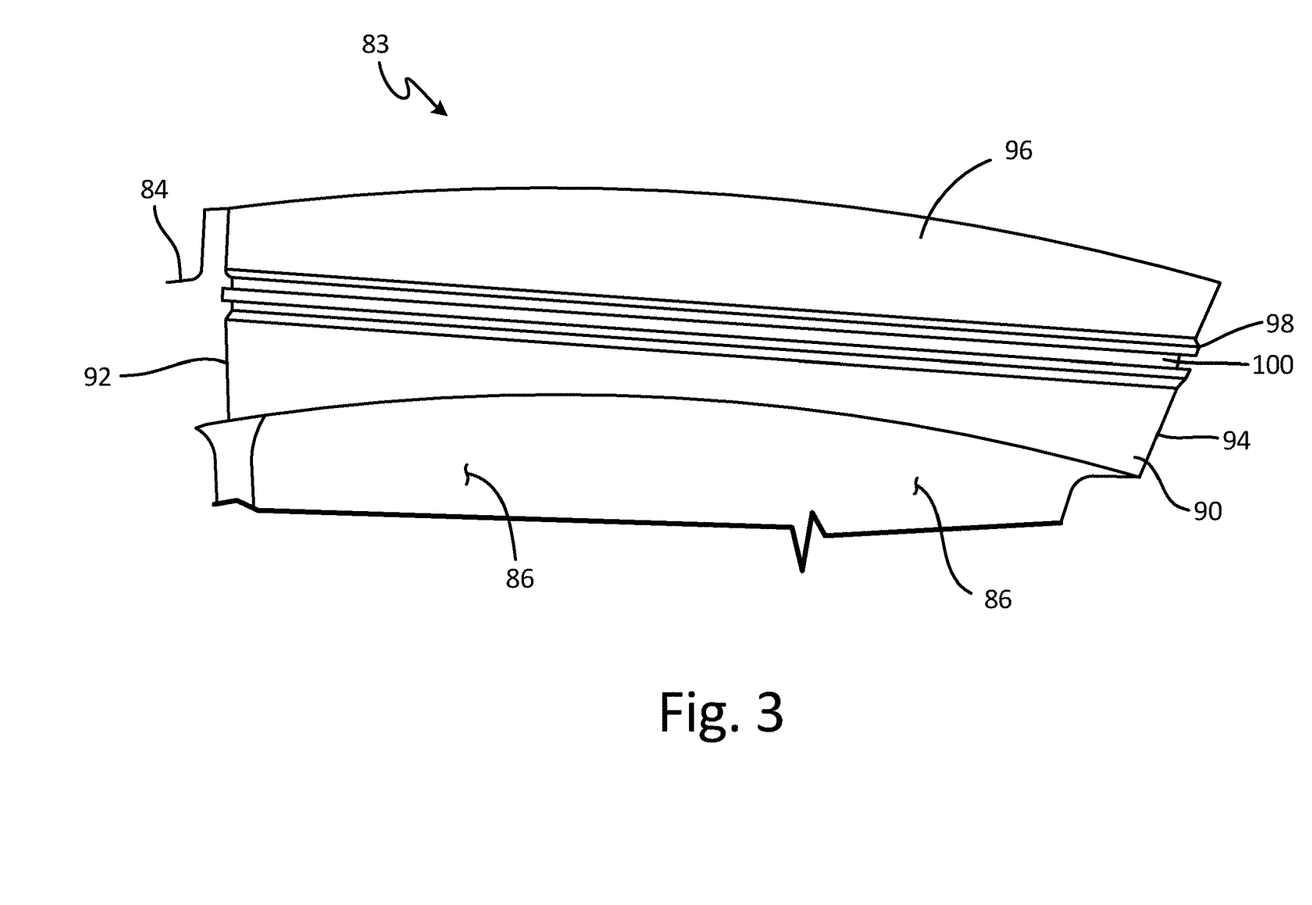
FIG. 3 is a perspective view of an aft end of an outer diameter platform of a vane segment of the first vane stage from FIG. 2.

FIGS. 2-3 will be discussed concurrently. FIG. 2 is a cross-sectional view of high pressure turbine section 54 with rotor assembly 62 and vane assembly 64. FIG. 3 is a perspective view of an aft end of one vane segment 83 from vane assembly 64 shown in FIG. 2. Vane assembly 64 can be positioned upstream from rotor assembly 62. Rotor assembly 62 can be a first stage turbine blade section for high pressure turbine section 54. Vane assembly 64 can include a plurality of vane segments 83 (only one of which is shown in FIG. 2) assembled as an array around center axis A (shown in FIG. 1) and can be a first stage vane section for high pressure turbine section 54. Core casing 66 can be disposed around both rotor assembly 62 and vane assembly 64 and can be spaced radially from rotor assembly 62 and vane assembly 64 to form plenum 68. Cooling airflow F can be directed through plenum 68 to cool the components of high pressure turbine section 54. Cooling airflow F travels through plenum 68 at pressures higher than the pressure of the hot combustion gases in the core flow path C.

Rotor assembly 62 can include mounting structure 72, blade outer air seal (BOAS) 74, and turbine blades 76 (only one of which is shown in FIG. 2). Mounting structure 72 can connect BOAS 74 to core casing 66 and can space BOAS 74 relative turbine blades 76. BOAS 74 is a static component that does not rotate about center axis A. BOAS 74 can include a forward end 78 disposed upstream from an aft end 80. Forward end 78 of BOAS 74 can include flange 82 that extends radially outward from forward end 78 to connect BOAS 74 to mounting structure 72. BOAS 74 forms an outer diameter endwall for the portion of core flow path C in rotor assembly 62. BOAS 74 is cooled by cooling airflow F, thereby allowing BOAS 74 to withstand the high temperatures of the hot combustion gases exiting the combustor 56 (shown in FIG. 1). As discussed in greater detail below, a seal is needed between rotor assembly 62 and BOAS 74 to help prevent cooling airflow F from leaking between rotor assembly 62 and vane assembly 64 and bleeding into core flow path C. Allowing cooling airfoil F to leak between vane assembly 64 and rotor assembly 62 reduces the pressure of cooling airflow F in plenum 68 and inhibits cooling airflow F from reaching and cooling BOAS 74. The mass flow rate of cooling airflow F can be increased to compensate for leakage of cooling airflow F, however, increasing the mass flow rate of cooling airflow F would decrease the operating efficiency and fuel efficiency of gas turbine engine 20. Thus, proper sealing between rotor assembly 62 and vane assembly 64 is necessary to sustain cooling airflow F in plenum 68 without decreasing fuel efficiency of gas turbine engine 20.

As shown in FIGS. 2-3, each of vane segments 83 includes outer diameter platform 84 and at least one airfoil 86 extending from outer diameter platform 84 toward center axis A (shown in FIG. 1). Outer diameter platform 84 is positioned radially outward from center axis A and can be aligned with BOAS 74. Outer diameter platform 84 is a static component that does not rotate about center axis A. Outer diameter platform 84 can be an endwall segment that forms the outer diameter flow path across vane segment 83 to direct combustion gases from combustor 56 to rotor assembly 62. Outer diameter platform 84 includes forward end 88 and aft end 90 disposed axially downstream from forward end 88 of outer diameter platform 84. Aft end 90 of outer diameter platform 84 is positioned axially upstream from forward end 78 of BOAS 74. Outer diameter platform 84 of vane segment 83 can also include first side 92, second side 94 (shown in FIG. 3), flange 96, rib 98, and recess 100.

Rib 98 is formed on aft end 90 of outer diameter platform 84. Rib 98 extends axially aft from aft end 90 of outer diameter platform 84 toward forward end 78 of BOAS 74 and contacts forward end 78 of BOAS 74. As shown in FIG. 3, outer diameter platform 84 extends circumferentially between first side 92 and second side 94 so that outer diameter platform 84 arcs to follow an outer circumference of core flow path C. Rib 98 can extend on aft end 90 of outer diameter platform 84 in a straight line from first side 92 to second side 94. By forming rib 98 in a straight line on aft end 90, rib 98 allows vane segment 83 to tilt relative BOAS 74 without opening a leakage gap between vane segment 83 and BOAS 74. In addition to allowing vane segment 83 to tilt relative BOAS 74 without opening a leakage gap, forming rib 98 in a straight line on aft end 90 of outer diameter platform 84 is faster and simpler under conventional machining technology than forming rib 98 in an arc, thereby reducing production costs for vane segment 83 without affecting the performance of vane segment 83 and rib 98. When vane segment 83 is assembled with other vane segments 83 in vane assembly 64, the ends of rib 98 will meet up with the ends of ribs 98 on adjacent vane segments 83.

Recess 100 is formed in rib 98. As shown in FIG. 3, recess 100 can be a groove that extends on rib 98 from first side 92 to second side 94 of outer diameter platform 84. Similar to rib 98, recess 100 can extend in a straight line so as to follow rib 98. Recess 100 can be parallel to rib 98.

Aft end 90 of outer diameter platform 84 can also include flange 96 extending radially outward from outer diameter platform 84 at aft end 90. While FIGS. 2 and 3 show rib 98 and recess 100 being disposed on aft end 90 of outer diameter platform 84 radially inward from flange 96, rib 98 and recess 100 can be positioned on flange 96 in alternative embodiments. As discussed in greater detail below with reference to FIGS. 4 and 5, rib 98 with recess 100 interacts with BOAS 74 as a seal to reduce leakage of cooling airflow F between outer diameter platform 84 of vane segment 83 and BOAS 74.

Figure 4:
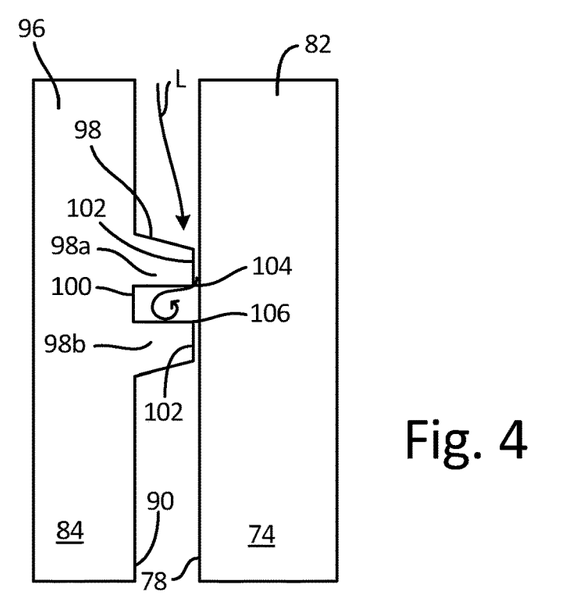
FIG. 4 is a cross-sectional view of a blade outer air seal and the aft end of the outer diameter platform from FIG. 3 in a first position.
Figure 5:
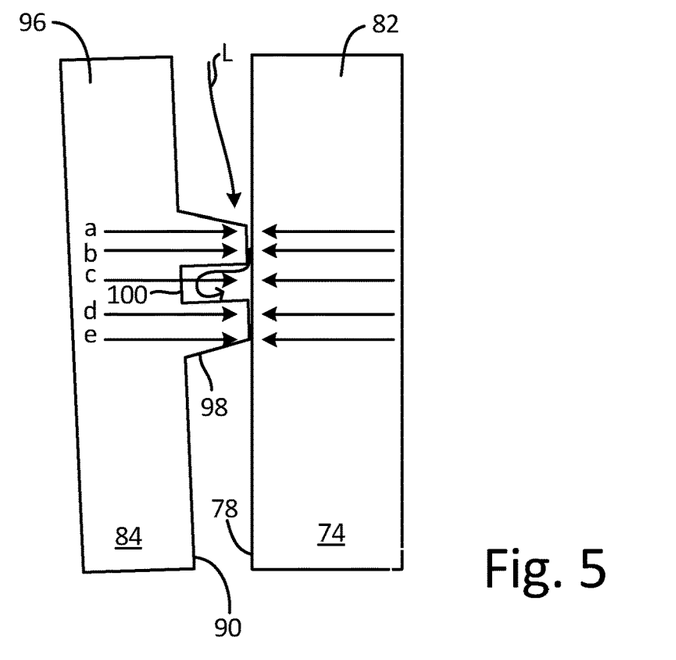
FIG. 5 is a cross-sectional view of the aft end of the outer diameter platform in a second position and the forward end of the blade outer air seal from FIG. 4.

FIGS. 4 and 5 will be discussed concurrently. FIG. 4 is a cross-sectional view of aft end 90 of outer diameter platform 84 and forward end 78 of BOAS 74. FIG. 5 is another cross-sectional view of aft end 90 of outer diameter platform 84 and forward end 78 of BOAS 74 with the position of outer diameter platform 84 shifted relative BOAS 74. As shown in FIGS. 4 and 5, rib 98 can further include flat surface 102, upper edge 104, and lower edge 106.

Rib 98 is integral with outer diameter platform 84 and can be formed from the same material as outer diameter platform 84 and vane segment 83. Flat surface 102 can be formed on the aft end of rib 98. Flat surface 102 can be formed on rib 98 through a machining process, such as grinding. As shown in FIGS. 4 and 5, flat surface 102 contacts forward end 78 and/or flange 82 of BOAS 74 to impede leakage flow L from traveling between BOAS 74 and outer diameter platform 84 into core flow path C (shown in FIG. 2). Leakage flow L can be flow from cooling airflow F (shown in FIG. 2) that manages to flow between BOAS 74 and outer diameter platform 84. While the contact between flat surface 102 of rib 98 and BOAS 74 can impede leakage flow L between BOAS 74 and outer diameter platform 84, part deflections, geometric tolerances and surface imperfections in forward end 78 of BOAS 74 and/or flat surface 102 can create small flow pathways between flat surface 102 of rib 98 and forward end 78 of BOAS 74. The leakage flow L that passes into the small pathways between flat surface 102 of rib 98 and forward end 78 of BOAS 74 can be disrupted and impeded by recess 100.

Recess 100 can extend axially from flat surface 102 toward aft end 90 of outer diameter platform 84. In some embodiments, such as the embodiment shown in FIGS. 4 and 5, recess 100 can divide rib 98 into first rib 98a and second rib 98b. Similar to the description of FIG. 3, rib 98a and rib 98b can be parallel to one another and can extend on aft end 90 of outer diameter platform 84 in a straight line from first side 92 to second side 94 (shown in FIG. 3). First rib 98a is positioned outward from second rib 98b relative center axis A (shown in FIG. 1) so that recess 100 is disposed between first rib 98a and second rib 98b. Recess 100 can include but is not limited to a rectangular cross-sectional profile as shown in FIGS. 4 and 5. Recess 100 can intersect flat surface 102 perpendicularly so that recess 100 and flat surface 102 on first rib 98a can form 90-degree upper edge 104. Similarly, the rectangular cross-sectional profile of recess 100 and flat surface 102 on second rib 98b can form 90-degree lower edge 106.

During operation, recess 100 can allow rib 98 to wear into forward end 78 of BOAS 74 to further close the gap between rib 98 and BOAS 74 and stop leakage flow L faster than a rib without recess 100. Recess 100 allows rib 98 to wear into forward end 78 of BOAS 74 faster than a rib without recess 100 because recess 100 reduces the contact area between rib 98 and forward end 78 of BOAS 74. Furthermore, should leakage flow L pass between flat surface 102 of first rib 98 and forward end 78 of BOAS 74 and reach recess 100, recess 100 will cause leakage flow L to suddenly expand and decelerate into recess 100. Because upper edge 104 forms a sudden expansion of the flow, shown as a 90-degree edge at recess 100, upper edge 104 will induce turbulence in leakage flow L and flow separation between leakage flow L and the surfaces surrounding leakage flow L. The 90-degree edge of lower edge 106 maximizes the losses in the flow moving from recess 100 to the flowpath C because a sharp-edged orifice has lower discharge coefficients (higher losses) than a rounded orifice. Inducing turbulence and flow separation in leakage flow L reduces the pressure in the flow in recess 100 relative to chamber 68. As leakage flow L expands into recess 100, the pressure of leakage flow L in recess 100 decreases to a sufficient degree that leakage flow L has more difficulty overcoming the pressure of the hot combustion gases in core flow path C (shown in FIG. 2). Since leakage flow L has more difficulty overcoming the pressures of the hot combustion gases in core flow path C upon encountering recess 100, recess 100 reduces the rate at which leakage flow L parasitically bleeds into core flow path C. In experiments, results showed that recess 100 could impede the rate of leakage flow L over rib 98 by as much as 10 percent to 35 percent.

Because recess 100 and rib 98 (with first rib 98a and second rib 98b) impede leakage flow L by expanding leakage flow L in recess 100, rib 98 and recess 100 can move on forward end 78 and/or flange 82 of BOAS 74 in the radial direction without a significant effect on the sealing properties of rib 98 and recess 100. During operation, especially during hot conditions, vane segment 83 can pivot slightly away from BOAS 74, form a small tapered gap that extends from wide point a and narrows through points b, c, and d to point e between rib 98 and forward end 78 of BOAS 74, as shown in FIG. 5. Experiments have shown that recess 100 is still able to reduce leakage flow L across rib 98 when vane segment 83 pivots slightly to form the small tapered gap that extends from wide point a to narrow point e between rib 98 and forward end 78 of BOAS 74. As discussed below with reference to FIG. 6, additional modifications can be made to rib 98 in other embodiments to further aid rib 98 in stopping leakage flow L.

Figure 6:
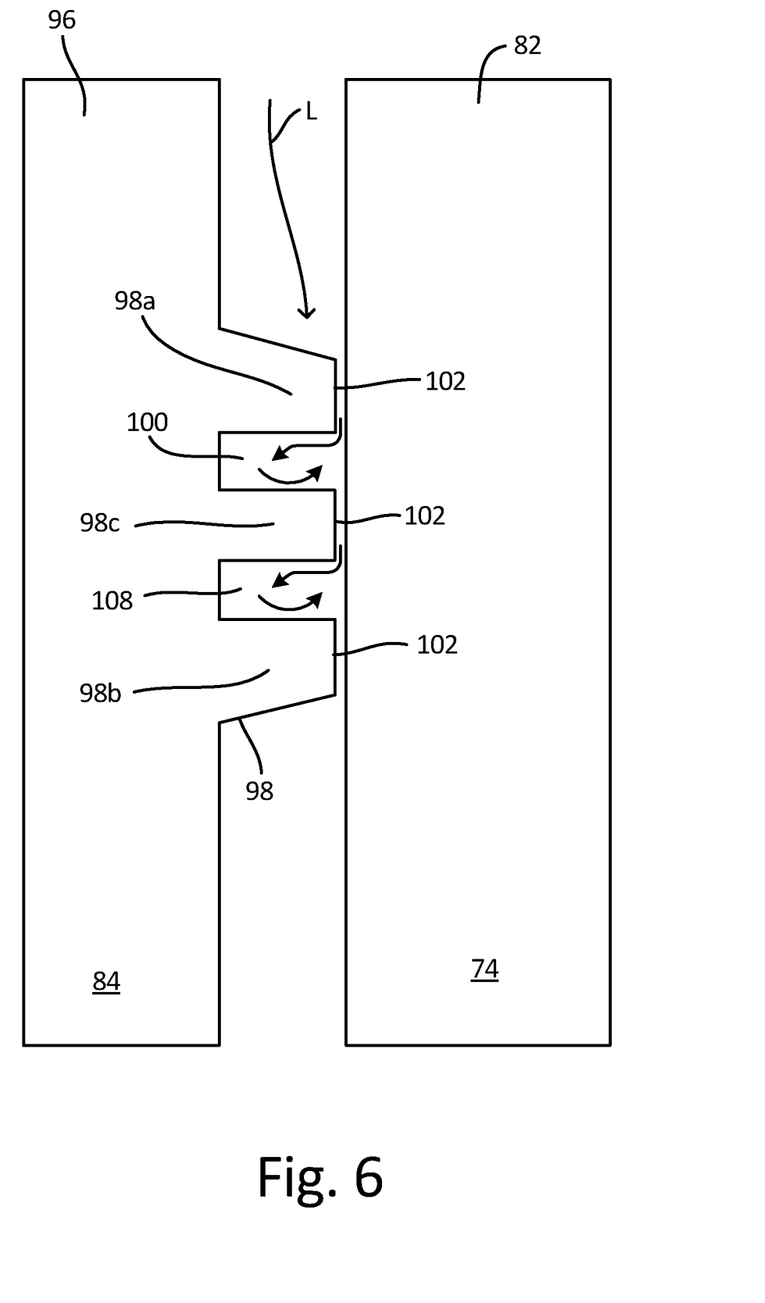
FIG. 6 is a cross-sectional view of another embodiment of an aft end of an outer diameter platform and a forward end of a blade outer air seal from FIG. 4.

FIG. 6 is a cross-sectional view of another embodiment of aft end 90 of outer diameter platform 84. As shown in FIG. 6, rib 98 can include second recess 108 in addition to recess 100. In some embodiments, recess 100 and second recess 108 can subdivide rib 98 into first rib 98a, second rib 98b, and third rib 98c. Recess 100 and second recess 108 can be parallel to one another so that first rib 98a, second rib 98b, and third rib 98c are also parallel to one another. In some embodiments, recess 100 and rib 108 need not be parallel. Second recess 108 can be positioned inward from recess 100 relative center axis A (shown in FIG. 1) so that second recess 108 is disposed between core flow path C (shown in FIG. 2) and recess 100. Recess 100 can function as described above with reference to FIGS. 4 and 5. Similar to recess 100 described in FIGS. 3-5, second recess 108 can extend on rib 98 from first side 92 to second side 94 of outer diameter platform 84. In some embodiments, surfaces 102 can be axially aligned so that surfaces 102 are in the same plane, or surfaces 102 can be axially displaced from one another so that surfaces 102 are in different planes.

Second recess 108 can further help recess 100 in impeding leakage flow L by expanding any portions of leakage flow L that might escape recess 100 and flow inward to second recess 108. By expanding the leakage flow L that enters second recess 108, second recess 108 causes the pressure of leakage flow L to decrease even further after the pressure drop of leakage flow L caused by recess 100. Thus, recess 100 and second recess 108 work together to decrease the pressure of leakage flow L to the point that leakage flow L is unable to overcome the pressure of the hot combustion gases in core flow path C and escape into the core flow path C.

Figure 7:
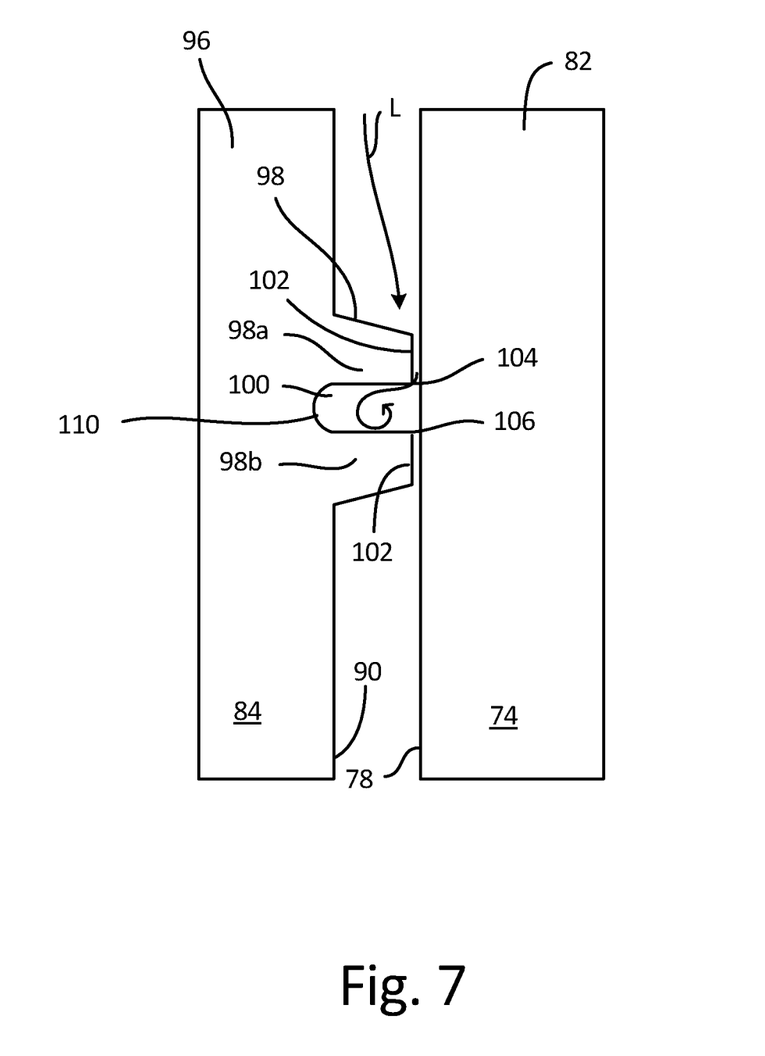
FIG. 7 is a cross-sectional view of another embodiment of an aft end of an outer diameter platform and a forward end of a blade outer air seal from FIG. 4.

FIG. 7 is a cross-sectional view of another embodiment of aft end 90 of outer diameter platform 84. As shown in FIG. 7, recess 100 can include curved end 110. Similar to recess 100 described in FIGS. 3-5, recess 100 with curved end 110 can extend on rib 98 from first side 92 to second side 94 of outer diameter platform 84. Recess 100 with curved end 110 in FIG. 7 can function similar to recess 100 as described above with reference to FIGS. 4 and 5.

In view of the foregoing description, it will be recognized that the present disclosure provides numerous advantages and benefits. For example, the present disclosure provides gas turbine engine 20 with vane segment 83. Vane segment 83 includes outer diameter platform 84 having rib 98 and recess 100 formed on aft end 90 of outer diameter platform 84. As discussed above with reference to the figures, rib 98 engages forward end 78 of BOAS 74 to impede leakage flow L. Recess 100 helps rib 98 impede leakage flow L by providing space for leakage flow L to suddenly expand and lose pressure to the point that leakage flow L in recess 100 is less able to overcome the pressures of the hot combustion gases in core flow path C. Because leakage flow L in recess 100 is less able to overcome the pressures of the hot combustion gases in core flow path C, leakage flow L is at least substantially reduced at recess 100. Reducing or stopping leakage flow L increases the efficiency of cooling airflow F in plenum 68, which in turn increases the fuel efficiency of gas turbine engine 20. Furthermore, because recess 100 and rib 98 (with first rib 98a and second rib 98b) impede leakage flow L by expanding leakage flow L in recess 100, rib 98 and recess 100 can move on forward end 78 and/or flange 82 of BOAS 74 without a significant effect on the sealing properties of rib 98 and recess 100. Thus, recess 100 and rib 98 can continue to impede leakage flow L even when vane segment 83 and BOAS 74 shift and move during operation due to thermal expansion.

The following are non-exclusive descriptions of possible embodiments of the present invention.

In one embodiment, a static component for a gas turbine engine includes an axially extending body comprising a forward end and an aft end disposed axially downstream from the forward end. A rib is formed on at least one of the forward end and the aft end of the axially extending body and extending axially from the axially extending body. A recess is formed in the rib.

The static component of the preceding paragraph can optionally include, additionally and/or alternatively, any one or more of the following features, configurations and/or additional components:

the rib is formed on the aft end of the axially extending body and the rib further comprises: a flat surface disposed at an aft end of the rib, wherein the recess extends axially from the flat surface toward the aft end of the axially extending body;

the axially extending body further comprises: a plurality of platform segments; and at least one airfoil extending from one of the plurality of platform segments;

an aft end of each of the plurality of platform segments extends circumferentially between a first side and a second side of the platform segment, wherein the rib extends on the aft end of the platform segment in a straight line from the first side to the second side, and wherein the recess extends on the rib from the first side to the second side in a straight line;

the recess and the flat surface form a 90 degree upper edge and a 90 degree lower edge;

the static component further comprises: a second recess formed on the rib, wherein the second recess is spaced radially from the recess relative the center axis; and/or the second recess is parallel to the first recess and extends on the rib from the first side to the second side of the platform segment.

In another embodiment, a vane and rotor assembly for a gas turbine engine includes a rotor assembly and a vane assembly. The rotor assembly includes an outer diameter endwall with a forward end disposed upstream from an aft end. The vane assembly is positioned upstream from the rotor assembly. The vane assembly includes an outer diameter platform with an aft end disposed axially upstream from the forward end of the outer diameter endwall of the rotor assembly. At least one airfoil extends from the outer diameter platform toward a center axis of the gas turbine engine. A rib is formed on the aft end of the outer diameter platform and extends axially aft from the aft end of the outer diameter platform toward the forward end of the outer diameter endwall. The rib contacts the forward end of the outer diameter endwall. A recess is formed in the rib.

The vane and rotor assembly of the preceding paragraph can optionally include, additionally and/or alternatively, any one or more of the following features, configurations and/or additional components:

the outer diameter endwall is a blade outer air seal of a turbine stage of the gas turbine engine;

the rib further comprises: a flat surface disposed at an aft end of the rib, wherein the flat surface contacts the forward end of the outer diameter endwall, and wherein the recess extends axially from the flat surface toward the aft end of the outer diameter platform;

the outer diameter platform extends circumferentially between a first side and a second side, and the rib extends on the aft end of the outer diameter platform in a straight line from the first side to the second side;

the recess extends on the rib from the first side to the second side and parallel to the rib; and/or the outer diameter endwall of the rotor assembly further comprises: a flange extending radially outward from the forward end of the outer diameter endwall, wherein the flat surface of the rib contacts the flange of the forward end of the outer diameter endwall of the rotor assembly.

In another embodiment, a vane segment for a gas turbine engine includes an outer diameter platform positioned radially outward from a center axis of the gas turbine engine. The outer diameter platform includes a forward end and an aft end disposed axially downstream from the forward end. At least one airfoil extends from the outer diameter platform toward the center axis. A first rib is formed on the aft end of the outer diameter platform and extends axially aft from the aft end of the outer diameter platform. A second rib is formed on the aft end of the outer diameter platform and extends axially aft from the aft end of the outer diameter platform. A recess is disposed between the first rib and the second rib.

The vane segment of the preceding paragraph can optionally include, additionally and/or alternatively, any one or more of the following features, configurations and/or additional components:

the first rib is parallel to the second rib;

the recess comprises a rectangular cross-sectional profile;

the outer diameter platform comprises a first side spaced from a second side in a circumferential direction relative the center axis, and wherein the first rib, the second rib, and the recess each extends in a straight line from the first side to the second side on the aft end of the outer diameter platform;

the recess and the first rib form a 90 degree upper edge;

the recess and the second rib form a 90 degree lower edge disposed inward from the 90 degree upper edge relative the center axis; and/or the aft end of the outer diameter platform comprises: a flange extending radially outward relative the center axis, and wherein the first rib, the second rib, and the recess are disposed on the flange.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIG. 3 shows rib 98 and recess 100 extending on aft end 90 of outer diameter platform 84 in a straight line from first side 92 to second side 94 of outer diameter platform 84, rib 98 and recess 100 can also extend circumferentially between first side 92 to second side 94 in an arc. In another example, while FIGS. 4 and 5 describe recess 100 as having a rectangular cross-sectional profile, recess 100 can alternatively include a trapezoidal cross-sectional profile, a triangular cross-sectional profile, a pentagonal cross-sectional profile, or any other cross-sectional profile that induces turbulence in leakage flow L. Accordingly, the angle of edges 104 and 106 of recess 100 can form angles other than 90 degrees.

In addition, many modifications may be made to adapt a particular situation or material to the teachings of the invention without departing from the essential scope thereof. To elaborate, while FIGS. 2-6 show rib 98 and recess 100 contacting BOAS 74, rib 98 and recess 100 can also be used on a vane segment that is disposed adjacent components other than BOAS. For example, rib 98 can be disposed on leading edge 88 of outer diameter platform 84 to seal a gap between outer diameter platform 84 and a combustor panel disposed upstream of vane assembly 64. In another example, while FIGS. 2 and 3 describe rib 98 and recess 100 as being formed on vane segment 83, rib 98 and recess 100 can be formed on a forward end or aft end of an engine case, a forward end or aft end of a dog-bone seal, such as the dog-bone seal disclosed in International Pub. No. WO 2015/088656 A1, or on the aft end or forward end of any endwall platform or component that spans the full circumference of core flow path C. Therefore, it is intended that the invention not be limited to the particular embodiment(s) disclosed, but that the invention will include all embodiments falling within the scope of the appended claims.

The invention claimed is:

1. A static component for a gas turbine engine comprises:
an axially extending body comprising a forward end and an aft end disposed axially downstream from the forward end, wherein the axially extending body further comprises a plurality of platform segments;
a rib formed on the aft end of the axially extending body and extending axially from the axially extending body, wherein the rib further comprises a flat surface disposed at an aft end of the rib; and
a recess formed in the rib, wherein the recess extends axially from the flat surface toward the aft end of the axially extending body,
wherein an aft end of each of the plurality of platform segments extends circumferentially between a first side and a second side of the platform segment, wherein the rib extends on the aft end of the platform segment in a straight line from the first side to the second side, and wherein the recess extends on the rib from the first side to the second side in a straight line.

2. The static component of claim 1, wherein the axially extending body further comprises:
at least one airfoil extending from one of the plurality of platform segments.

3. The static component of claim 1, wherein the recess and the flat surface form a 90 degree upper edge and a 90 degree lower edge.

4. The static component of claim 1, wherein the static component further comprises:
a second recess formed on the rib, wherein the second recess is spaced radially from the recess relative the center axis.

5. The static component of claim 4, wherein the second recess is parallel to the first recess and extends on the rib from the first side to the second side of the platform segment.

6. A vane and rotor assembly for a gas turbine engine, the vane and rotor assembly comprising:
a rotor assembly comprising:
an outer diameter endwall with a forward end disposed upstream from an aft end;
a vane assembly positioned upstream from the rotor assembly, wherein the vane assembly comprises:
an outer diameter platform, wherein the outer diameter platform comprises an aft end disposed axially upstream from the forward end of the outer diameter endwall of the rotor assembly, and wherein the outer diameter platform extends circumferentially between a first side and a second side;
at least one airfoil extending from the outer diameter platform toward a center axis of the gas turbine engine;
a rib formed on the aft end of the outer diameter platform and extending axially aft from the aft end of the outer diameter platform toward the forward end of the outer diameter endwall, wherein the rib comprises a flat surface disposed at an aft end of the rib, wherein the flat surface contacts the forward end of the outer diameter endwall, and wherein the rib extends on the aft end of the outer diameter platform in a straight line from the first side to the second side; and
a recess formed in the rib, wherein the recess extends axially from the flat surface toward the aft end of the outer diameter platform.

7. The vane and rotor assembly of claim 6, wherein the outer diameter endwall is a blade outer air seal of a turbine stage of the gas turbine engine.

8. The vane and rotor assembly of claim 6, wherein the recess extends on the rib from the first side to the second side and parallel to the rib.

9. The vane and rotor assembly of claim 8, wherein the outer diameter endwall of the rotor assembly further comprises:
a flange extending radially outward from the forward end of the outer diameter endwall,
wherein the flat surface of the rib contacts the flange of the forward end of the outer diameter endwall of the rotor assembly.

10. A vane segment for a gas turbine engine comprises:
an outer diameter platform positioned radially outward from a center axis of the gas turbine engine, wherein the outer diameter platform comprises a forward end and an aft end disposed axially downstream from the forward end, and wherein the outer diameter platform comprises a first side spaced from a second side in a circumferential direction relative the center axis;
at least one airfoil extending from the outer diameter platform toward the center axis;
a first rib formed on the aft end of the outer diameter platform and extending axially aft from the aft end of the outer diameter platform;
a second rib formed on the aft end of the outer diameter platform and extending axially aft from the aft end of the outer diameter platform; and
a recess disposed between the first rib and the second rib, and
wherein the first rib, the second rib, and the recess each extends in a straight line from the first side to the second side on the aft end of the outer diameter platform.

11. The vane segment of claim 10, wherein the first rib is parallel to the second rib.

12. The vane segment of claim 11, wherein the recess comprises a rectangular cross-sectional profile.

13. The vane segment of claim 10, wherein the recess and the first rib form a 90 degree upper edge.

14. The vane segment of claim 13, wherein the recess and the second rib form a 90 degree lower edge disposed inward from the 90 degree upper edge relative the center axis.

15. The vane segment of claim 10, wherein the aft end of the outer diameter platform comprises:
a flange extending radially outward relative the center axis, and
wherein the first rib, the second rib, and the recess are disposed on the flange.

* * * * *